Feb. 28, 1967 W. JOHN 3,306,149

ROTARY CUTTER

Filed Jan. 12, 1965

INVENTOR.
WALTER JOHN

BY

ATTORNEY 3,306,149
ROTARY CUTTER
Walter John, Unter-Grundemich, Germany, assignor to Dienes Werke fur Maschinenteile G.m.b.H., Vilkerath, near Cologne, Germany, a company
Filed Jan. 12, 1965, Ser. No. 425,027
Claims priority, application Germany, Feb. 12, 1964, D 43,604
2 Claims. (Cl. 83—676)

This invention relates generally to an improvement in a rotary cutting apparatus and more particularly to a disc type rotary cutter thereof.

The device in accordance with this invention is commonly employed for slitting such relatively tough materials as adhesive strips, for instance those for wound dressing, plastic foil, rubber, cardboard and the like.

The cutting apparatus, as presently known, includes a rotary roller or disc provided with a cutting edge along the outer peripheral rim thereof. The cutter is severely biased against a hard surface of an oppositely rotating feed roller. It is therefore necessary to construct the cutter of high grade steel and to rigidly support the same in a manner to avoid angular or tilting movement.

In the prior art the hub area of the disc is reinforced with a cylindrical member, a usually a machined part with close tolerances, provided with outer flanges whose faces are disposed in bearing engagement with a stationary housing. In order to maintain the cutter disc at the same predetermined attitude it is essential that a close tolerance fit be maintained between the end faces of the hub reinforcing member and the support housing. To compensate for operational wear the tolerance between the reinforcing member and the housing must be adjustable. Unfortunately, only very limited lubrication is here possible because of the proximity of the goods to be cut.

It is therefore the primary object of this invention to provide an improved cutter disc which avoids the shortcomings of the prior art device.

It is another object of this invention to provide a cutting disc formed with a reinforcement and support member obviating the requirement for machining parts thereof and the attendant expenses, while nevertheless providing a permanent, close tolerance and rigid support for the cutter disc.

It is a further object of this invention to provide a cutter formed with a hub reinforcement and support member having a low friction and dry bearing surface which obviates the need for wet lubrication of the bearing surfaces.

It is still another object of this invention to provide a simplified rotary cutter with hub reinforcement and support parts thereof formed as a unitary plastic body to reduce manufacturing costs, improve wear and frictional properties to obviate need for adjusting tolerance requirements relative to the supporting structures, and to facilitate a smoother running of the cutter disc.

An aspect of the present invention resides in the provision of a circular disc having a cutting edge located along the outer periphery of the disc. The latter has a central aperture and disposed into same is a reinforcing and support hub formed of a plastic base material. The hub has a tubular portion which is coaxial with the central aperture and at its ends is formed with laterally extending flanges. The flanges are integrally united with the tubular portion and are adapted for clamping the disc tightly therebetween. The flange on each side of the disc provides a dry lubricant bearing surface.

For a better understanding of the present invention, together with other and further objects thereof, reference is had to the following description taken in connection with the accompanying drawings, and their scope will be pointed out in the appended claims.

Figure 2:
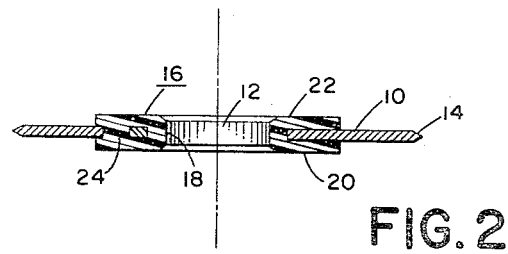
FIGURE 2 is a cross-sectional view taken along line 1—1 of FIGURE 1.
Figure 1:
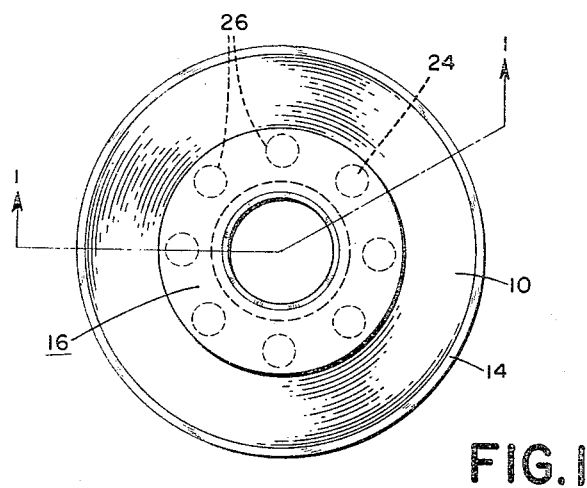
FIGURE 1 is a top view of a cutter disc constructed in accordance with this invention.

Referring now to the drawing, there is shown a relatively thin, circular, cutter disc 10 formed of a rigid, e.g. steel, material and with a central aperture 12. The outer periphery or rim of the disc 10 is honed and has a fine cutting edge 14.

The cutter disc or wheel 10 is rigidly supported by a unitary reinforcing and support hub 16 formed of a plastic base material, preferably, polyurethane, die casted in one piece and in such manner to form a cylindrical portion 18 extending through the aperture 12 of the disc 10 and, at each axial end of the cylindrical portion 18 to provide laterally extending flanges 20 and 22. The flanges being integrally united by way of the cylindrical portion 18 and effective to tightly clamp the disc 10 therebetween. The support hub 16 is thus permanently seated between the two sides of disc 10 and cannot become accidentally disengaged or dislodged short of a total destruction thereof.

The rigidity and reinforcement of the hub 16 is, in an alternate construction, further enhanced by providing a connecting link 24 directly between the flanges 20 and 22. To facilitate this construction, a plurality of apertures 26 are drilled into the disc in circular, or offset, array about the central aperture 12 and more or less substantially coaxial therewith. During die casting of the hub member 16, the plastic material flows through and permeates each aperture 26. This establishes in each aperture 26 an integral and permanent connecting link 24 to and between the flanges.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A rotary cutter comprising: a circular disc having a cutting edge located along the outer periphery thereof and provided with an axially extending central aperture; a reinforcing and support hub formed of a plastic base material having dry lubricant characteristics including a substantially tubular portion disposed coaxially with said aperture and having a radially extending flange of uniform thickness and with a flat front face at each axial end of said cylindrical portion and being integrally united therewith for clamping said disc between said flanges and to provide a dry lubricant bearing surface on each side of said disc.

2. A rotary cutter according to claim 1, wherein said plastic base material is polyurethane.

References Cited by the Examiner
UNITED STATES PATENTS

| | | | |
|---|---|---|---|
| 244,845 | 7/1881 | Bowles | 83—430 |
| 3,176,455 | 4/1965 | Buchanan | 83—676 |

OTHER REFERENCES 315,100   9/1956   Switzerland.

ANDREW R. JUHASZ, Primary Examiner.
L. B. TAYLOR, Assistant Examiner.